United States Patent [19]
Broze et al.

[11] Patent Number: 5,374,372
[45] Date of Patent: Dec. 20, 1994

[54] NONAQUEOUS LIQUID CRYSTAL COMPOSITIONS

[75] Inventors: Guy Broze, Grace-Hollogne; Louis Oldenhove de Guertechin, Heks, both of Belgium

[73] Assignee: Colgate Palmolive Company, Piscataway, N.J.

[21] Appl. No.: 112,290

[22] Filed: Aug. 27, 1993

[51] Int. Cl.$^5$ .................. C09K 19/00; C11D 9/32; C11D 17/00
[52] U.S. Cl. .................. 252/299.01; 428/1; 252/121; 252/122; 252/174.12; 252/174.21; 252/174.23; 252/DIG. 1; 252/DIG. 12; 252/DIG. 19
[58] Field of Search ............ 252/299.01, 121, 122, 252/174.12, 174.21, 174.23, DIG. 1, DIG. 12, DIG. 19; 428/1

[56] References Cited

U.S. PATENT DOCUMENTS

| | | | |
|---|---|---|---|
| 5,035,826 | 7/1991 | Durbut et al. | 252/121 |
| 5,096,612 | 3/1992 | Pinter et al. | 252/299.01 |
| 5,190,915 | 3/1993 | Behan et al. | 512/2 |

*Primary Examiner*—Shean Wu
*Attorney, Agent, or Firm*—Richard E. Nanfeldt; Robert C. Sullivan; Murray Grill

[57] ABSTRACT

The present invention relates to a liquid crystal composition which comprises approximately by weight 7 to 70% a nonionic surface active agent, 0 to 30% of an aliphatic hydrocarbon having about 6 to 16 carbon atoms, and 10 to 90% of an essentially nonaqueous polar solvent having a Hansen hydrogen bonding solubility parameter at 25° C. of at least 12M Pa$^{\frac{1}{2}}$.

20 Claims, 20 Drawing Sheets

NONAQUEOUS LIQUID CRYSTAL COMPOSITIONS

FIELD OF THE INVENTION

This invention relates to a liquid crystalline composition and especially a liquid crystalline detergent composition. More specifically, it is of an essentially non-aqueous detergent composition in liquid crystal state or form which, by virtue of both its non-aqueous and liquid crystalline nature, is superior to other liquid detergent compositions because it is able to incorporate and/or suspend water sensitive ingredients which impart to the composition a superior efficacy in cleaning tasks. Additionally, the composition could be converted to a microemulsion when brought into contact with water.

BACKGROUND OF THE INVENTION

Liquid aqueous synthetic organic detergent compositions have long been employed for human hair shampoos and as dishwashing detergents for hand washing of dishes (as distinguished from automatic dishwashing machine washing of dishes). Liquid detergent compositions have also been employed as hard surface cleaners, as in pine oil liquids, for cleaning floors and walls. More recently they have proven successful as laundry detergents too, apparently because they are convenient to use, are instantly soluble in wash water, and may be employed in "pre-spotting" applications to facilitate removals of soils and stains from laundry upon subsequent washing. Liquid detergent compositions have comprised anionic, cationic and nonionic surface active agents, builders and adjuvants, including, as adjuvants, lipophilic materials which can act as solvents for lipophilic soils and stains. The various liquid aqueous synthetic organic detergent compositions mentioned serve to emulsify lipophilic materials, including oily soils, in aqueous media, such as wash water, by forming micellar dispersions and emulsions.

Non aqueous liquid crystals Of glycerol/sodium dodecyl sulfonate/Decanol have been disclosed by Friberg and Co. in Colloids and Polymer Science 264:449–453 (1986). Rico and Lattes claim the formation of liquid crystals of formamide/cetyltrimethylamonium bromide/cyclohexane/1-butanol and of formamide/potassium 2,2,3,3 tetrahydroperftouroundecanoate/1,1,2,2 tetrahydroperfluorohexanol/perfluorinated oils in Nouveau Journal de Chimie vol. 8, No. 7, 1984, p 429 and in Journal of Colloid and Interface Science Vol. 102, No. 1, Nov. 1984 respectively. Liquid crystals of cationic surfactants and various polar solvents have been disclosed by Warnheim and Co. in Progr. Colloid Polymer Science, 82: 271–279 (1990) and in Journal of Colloid and Interface Science, Vol. 125, No. 2 (Oct. 1988). The use of nonionic surfactants in combination with aliphatic hydrocarbons and nonaqueous polar solvent has not been disclosed for the formation of liquid crystals in nonaqueous solvents which can be used in consumer detergents.

The nonaqueous compositions are applicable for use in concentrated household care products and personal care products because they can contain water incompatible active ingredients such as bleachants and/or enzymes. The nonaqueous compositions of the instant invention comprise harmless ingredients as compared to the formamide based composition disclosed by T. Warnheim and M. Sjoberg which could never be used in household or body care products. The instant compositions permit the preparation of super concentrated cleaning or conditioning liquid products containing high level of nonionic surfactants.

The instant nonaqueous compositions can form a gel upon a minimum deletion with water and as such are applicable in oral products. A thin layer of the nonaqueous liquid crystals could be sprayed or otherwise deposited on the teeth and subsequently gelled or thickened by the saliva to allow brushing.

In accordance with the present invention a liquid detergent composition, suitable at room temperature or colder or at a higher temperature, for pre-treating and cleaning materials soiled with a lipophilic soil, is in a nonaqueous liquid crystalline form and comprises a nonionic surface active agent, an aliphatic hydrocarbon and a nonaqueous polar solvent and, optionally, a polar cosolvent. The invention also relates to processes for treating items and materials soiled with soils such as lipophilic soil, with compositions of this invention, to loosen or remove such soil by applying to the locus of such soil on such material a soil loosening or removing amount of the compositions of the instant invention. The invention is also being in the possible conversion of the nonaqueous liquid crystalline composition into a microemulsion by the addition of water thereto into a gel or a solution depending upon the amount of the water addition. In another aspect of the invention lipophilic soil is absorbed from the soiled surface into the nonaqueous composition and then contacted with water so as to convert the microemulsion to solution form.

SUMMARY OF THE INVENTION

The instant invention relates to a liquid crystal composition having an apparent viscosity at $10^{-2}$ sec$^{-1}$ of about 7.5 to about 300 Pa. sec. centipoises, more preferably 5 to 20 Pa. sec. and an apparent viscosity at $10^2$ sec$^{-1}$ of about 0.05 to about 7.5 Pa.sec., more preferably 0.05 to 0.5 Pa. sec. which comprises approximately by weight 7 to 50% of a nonionic surface active agent; to 5 to 32% of an aliphatic hydrocarbon having about 9 to 15 carbon atoms, and 10 to 60% of a nonaqueous polar solvent having a Hansen hydrogen bonding cohesion parameter $(d_h)$ at 25° C. of at least 15.0 MPa$^{\frac{1}{2}}$ and Hansen polar cohesion parameter $(d_p)$ at 25° C. of at least about 10 MPa$^{\frac{1}{2}}$ as set forth in the Handbook of Solubility Parameters by Allan K. M. Barton, CRC Press, Pages 94–109 and 153–161 (1983).

Accordingly, it is an object of the instant invention to provide a liquid crystal composition which is useful in a cleaning operation and can be possibly converted into a microemulsion by contacting the liquid crystal composition with water.

Another object of the instant invention is to provide a nonaqueous liquid crystal medium for water sensitive materials such as enzymes.

Another object of the instant invention is to provide a nonaqueous liquid crystal medium for the immiscible liquid droplets; abrasive particles, insoluble particles of active ingredients within the suspension medium.

A still further object is to provide a detergent composition in a liquid crystal form which exhibits improved adherence onto vertical surfaces, when the composition is applied to the vertical surface in neat form such as by spraying.

BRIEF DESCRIPTION OF THE DRAWINGS

In FIGS. 16 to 20, the stability of liquid crystals is expressed as the percentage of volume occupied by the liquid crystalline phase in the total composition. Therefore, 100% LC stability means that no phase separation has occurred within the mentioned aging period.

DETAILED DESCRIPTION OF THE INVENTION

Figure 1:
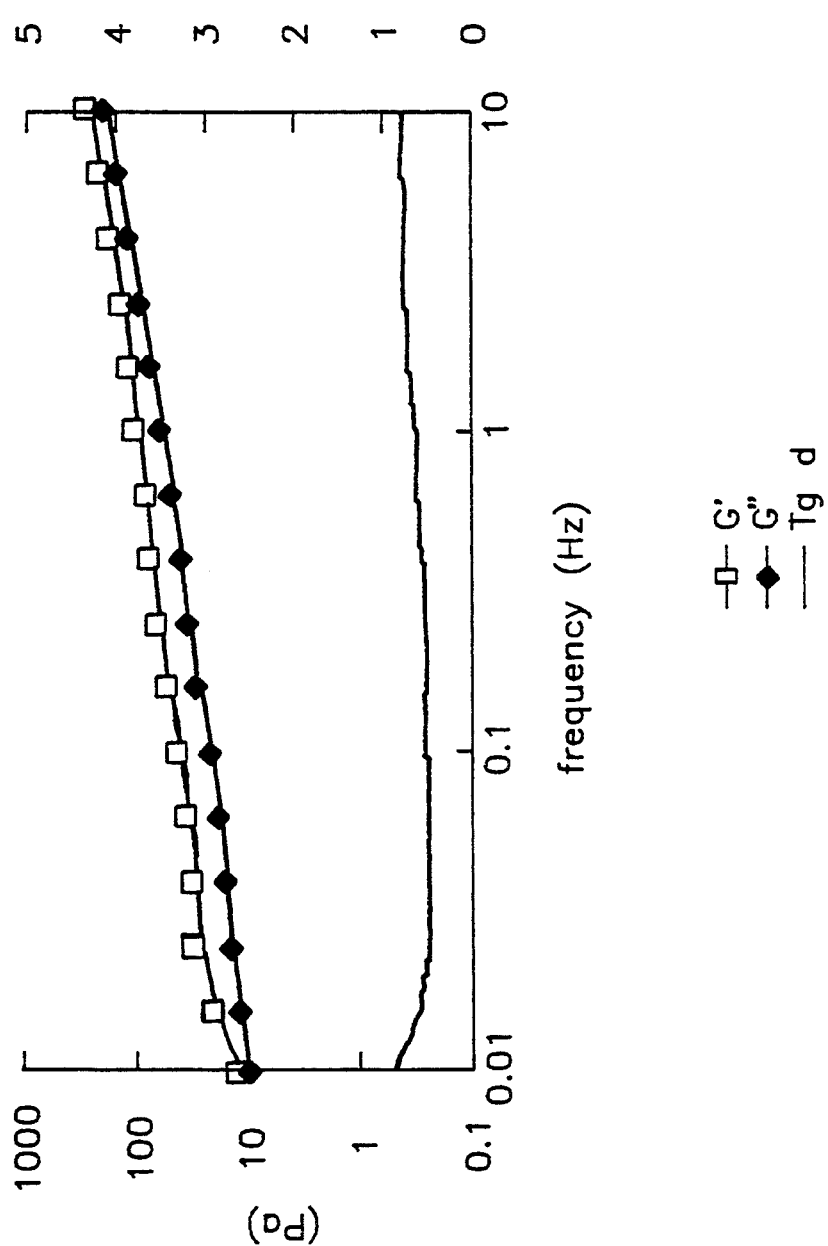
FIGS. 1 to 4 illustrate plots of G' and G'' (Pa.) against frequency (Hz) for the liquid crystalline compositions of examples C-D-F-G.
Figure 2:
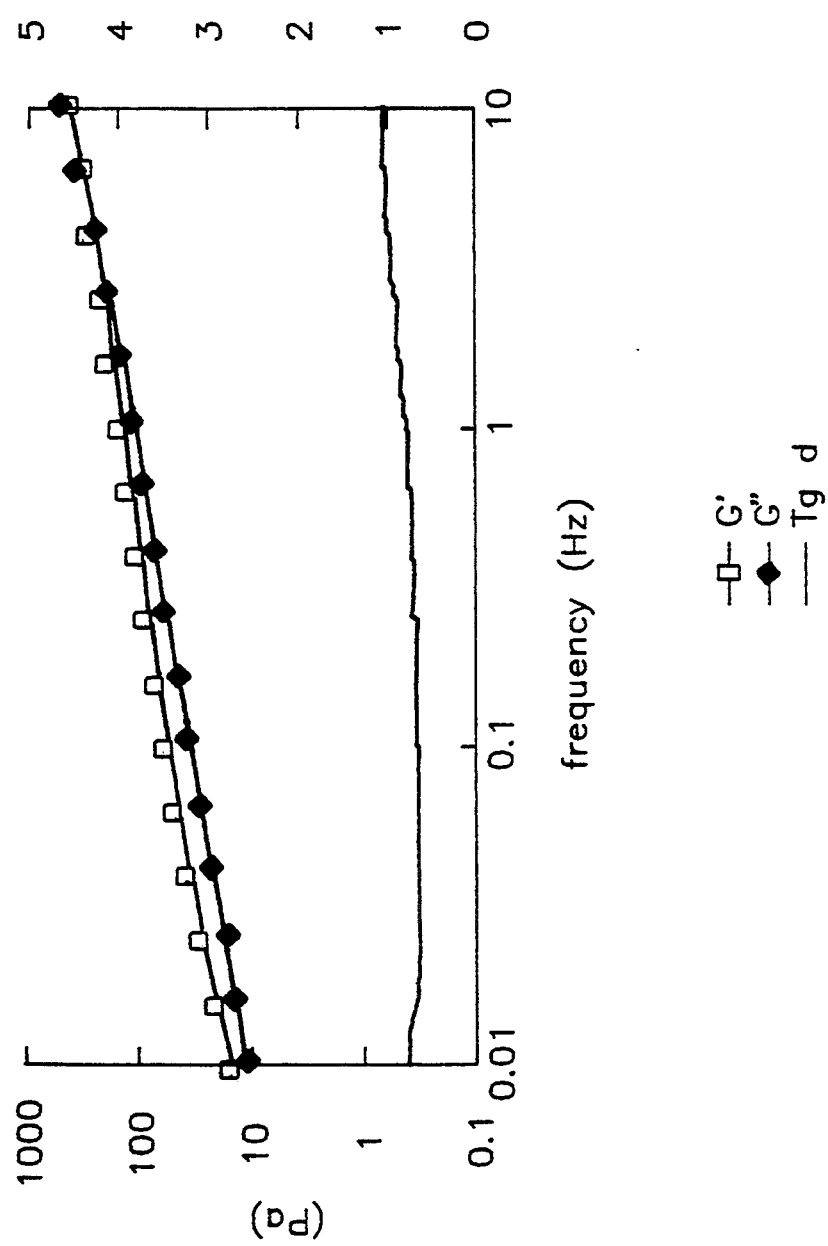
Figure 3:
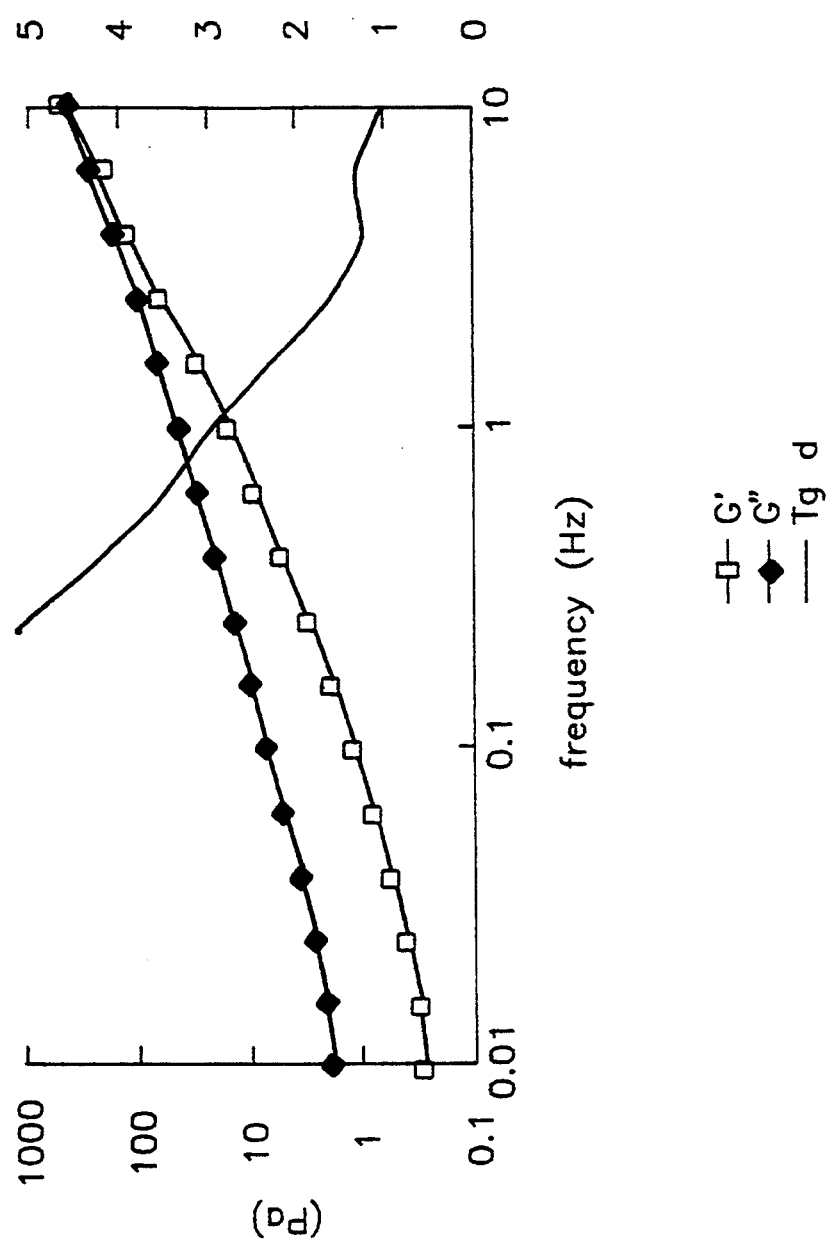
Figure 4:
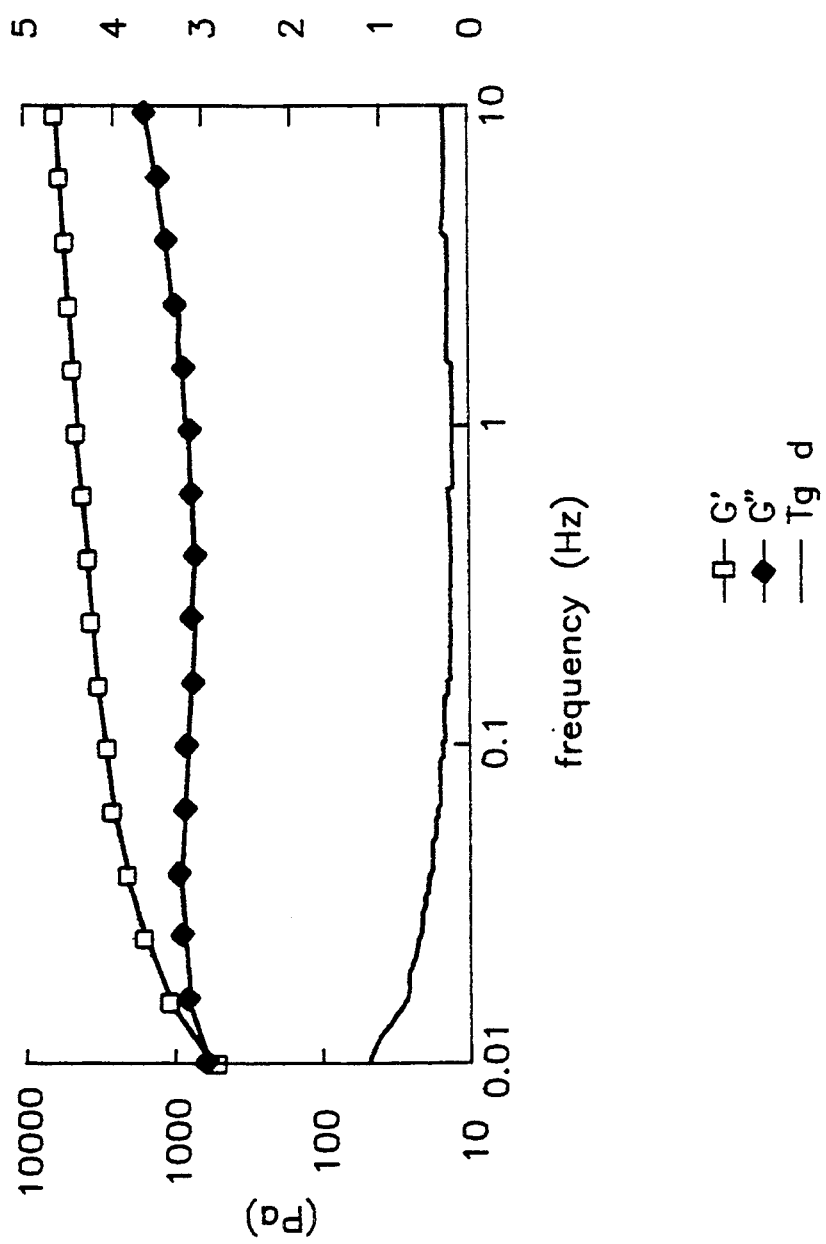
Figure 5:
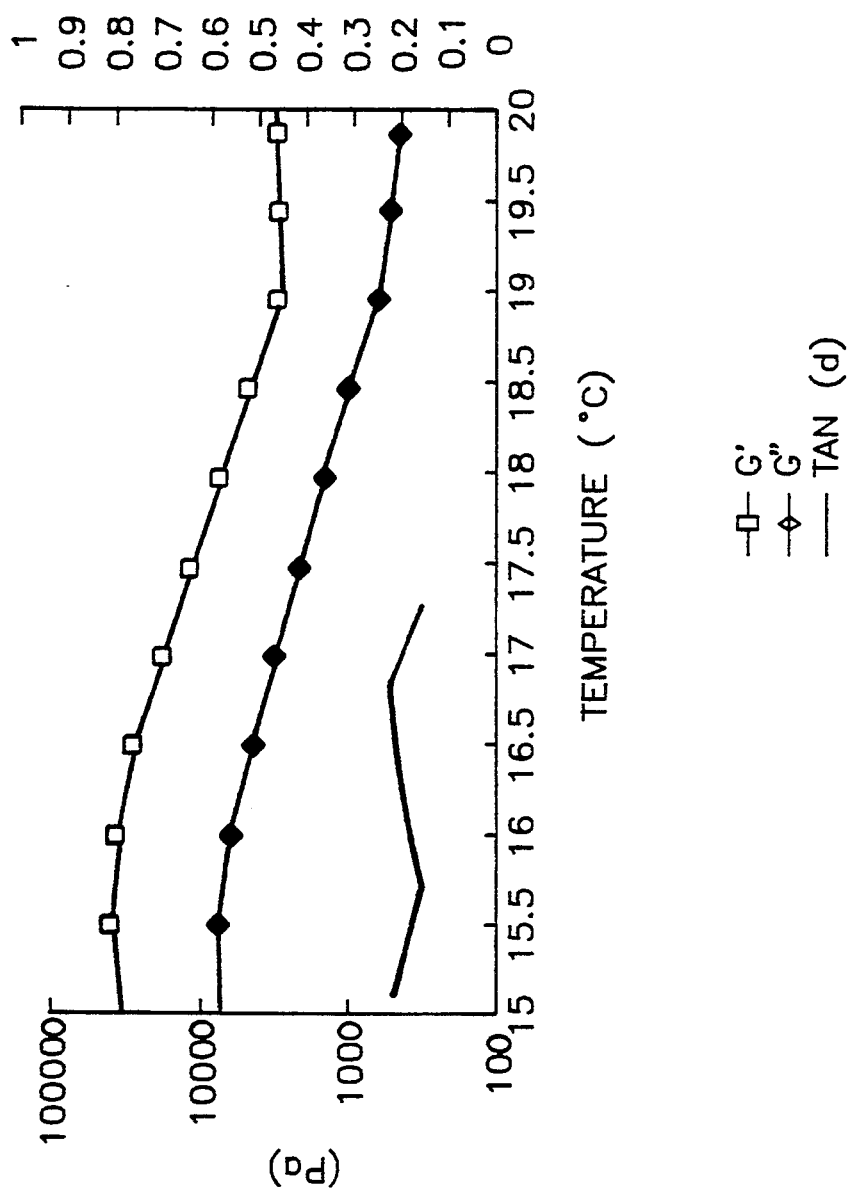
FIG. 5 illustrates plot of G' and G'' (Pa.) against temperature (°C.) for the liquid crystalline composition of example G.
Figure 6:
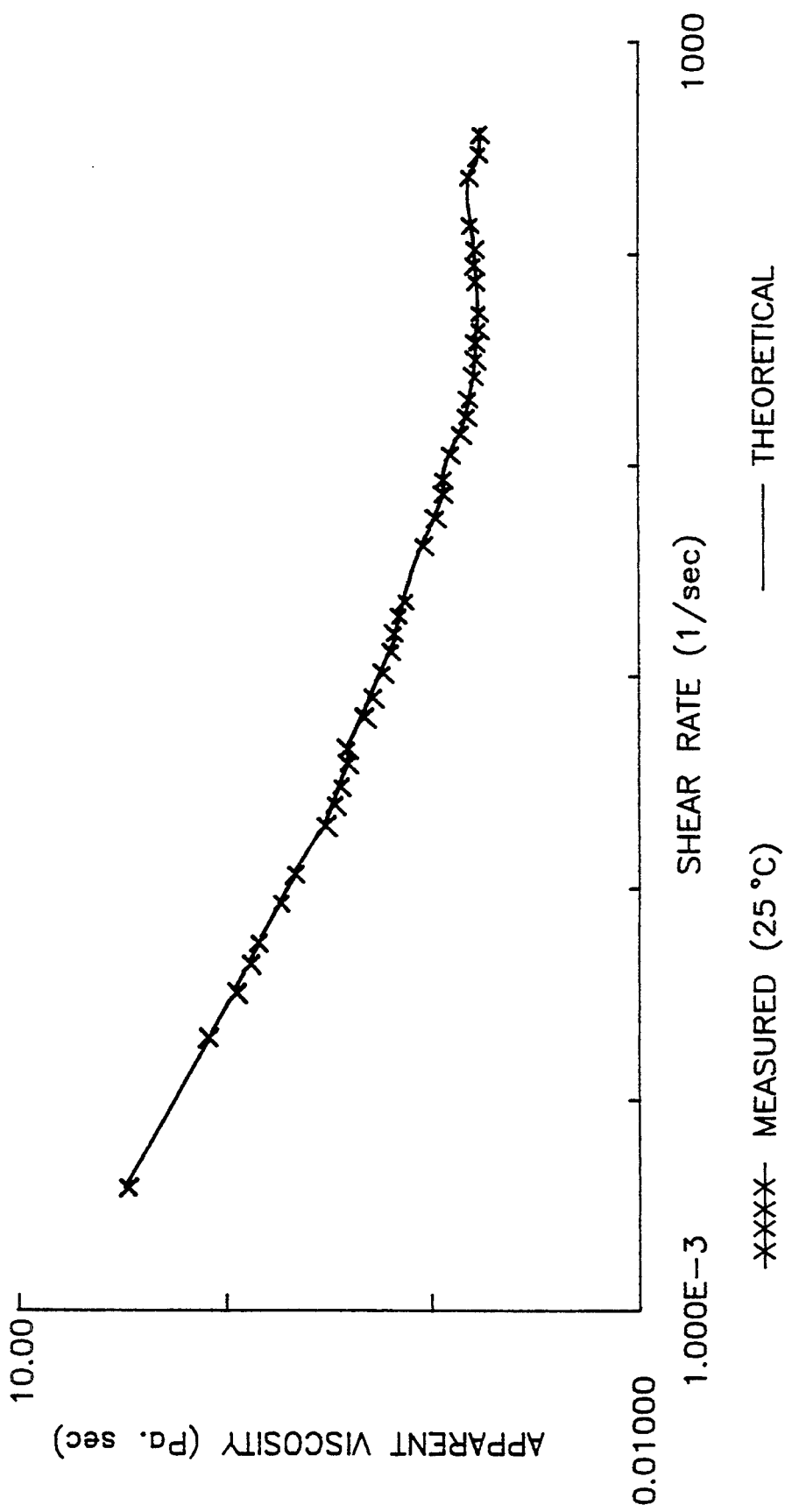
FIGS. 6 to 10 illustrate plots of apparent viscosity (Pa. sec.) against shear rate ($sec^{-1}$) for the liquid crystalline composition compositions of examples A-G-C-E-G.
Figure 7:
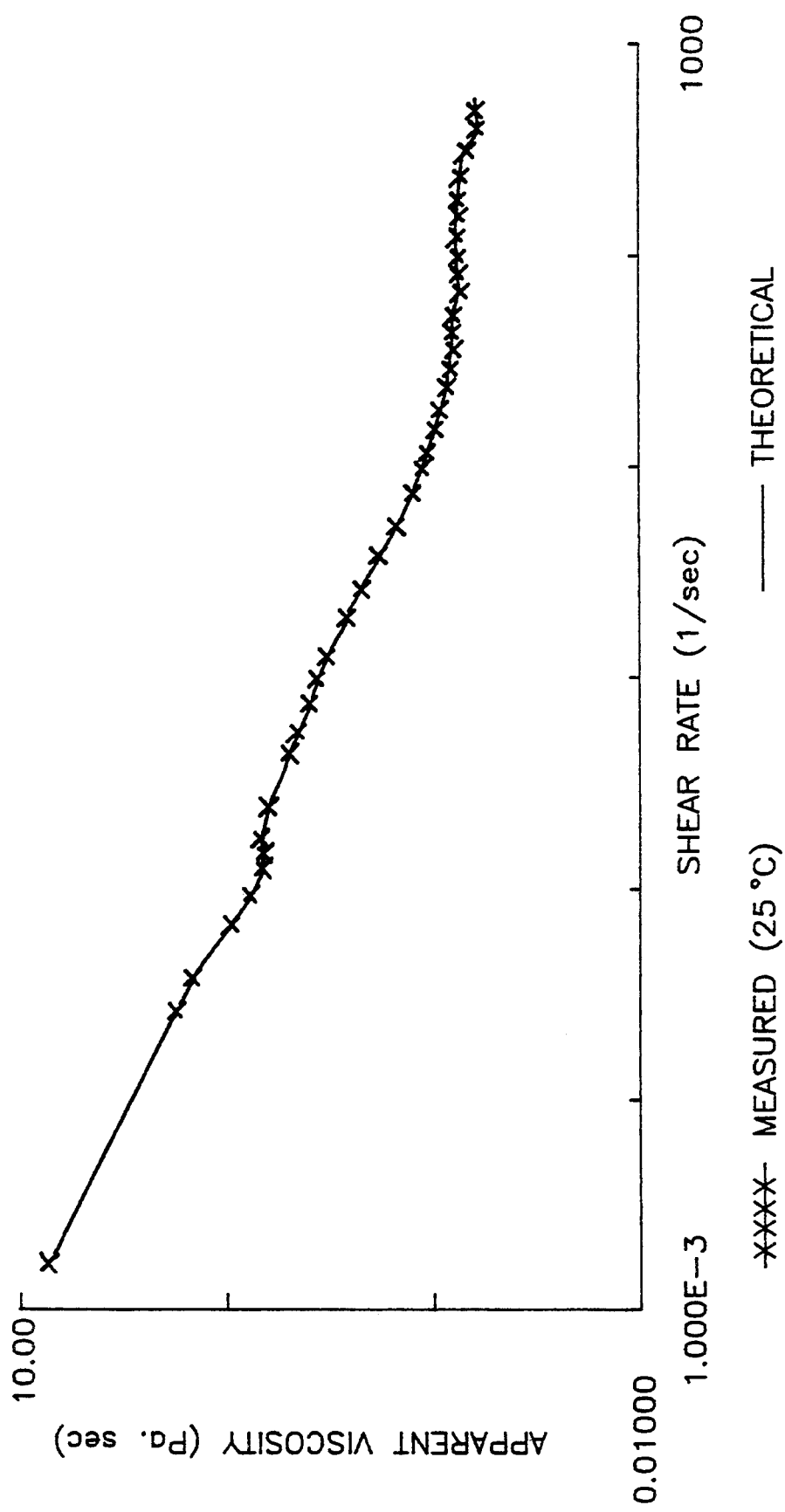
Figure 8:
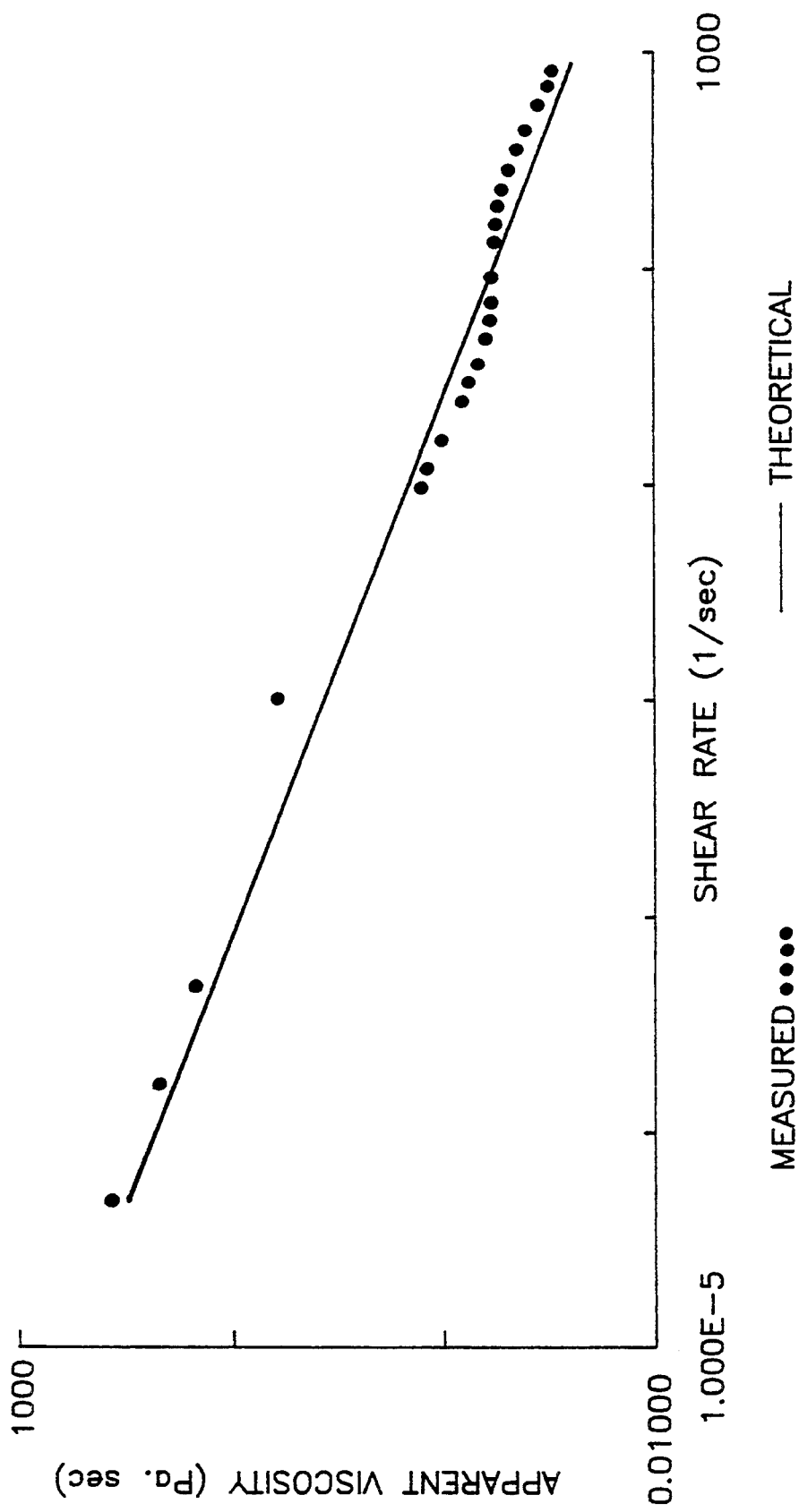
Figure 9:
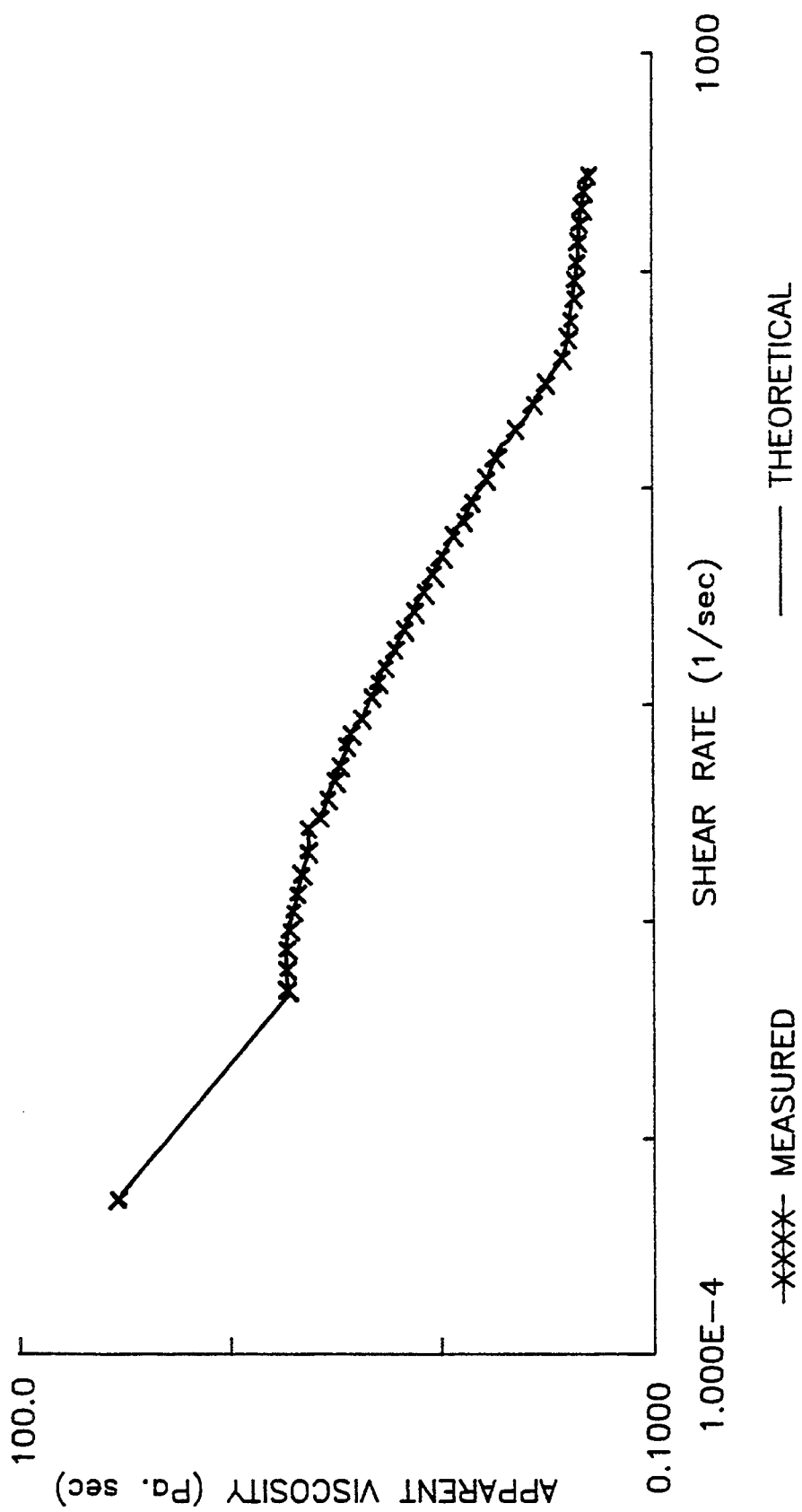
Figure 10:
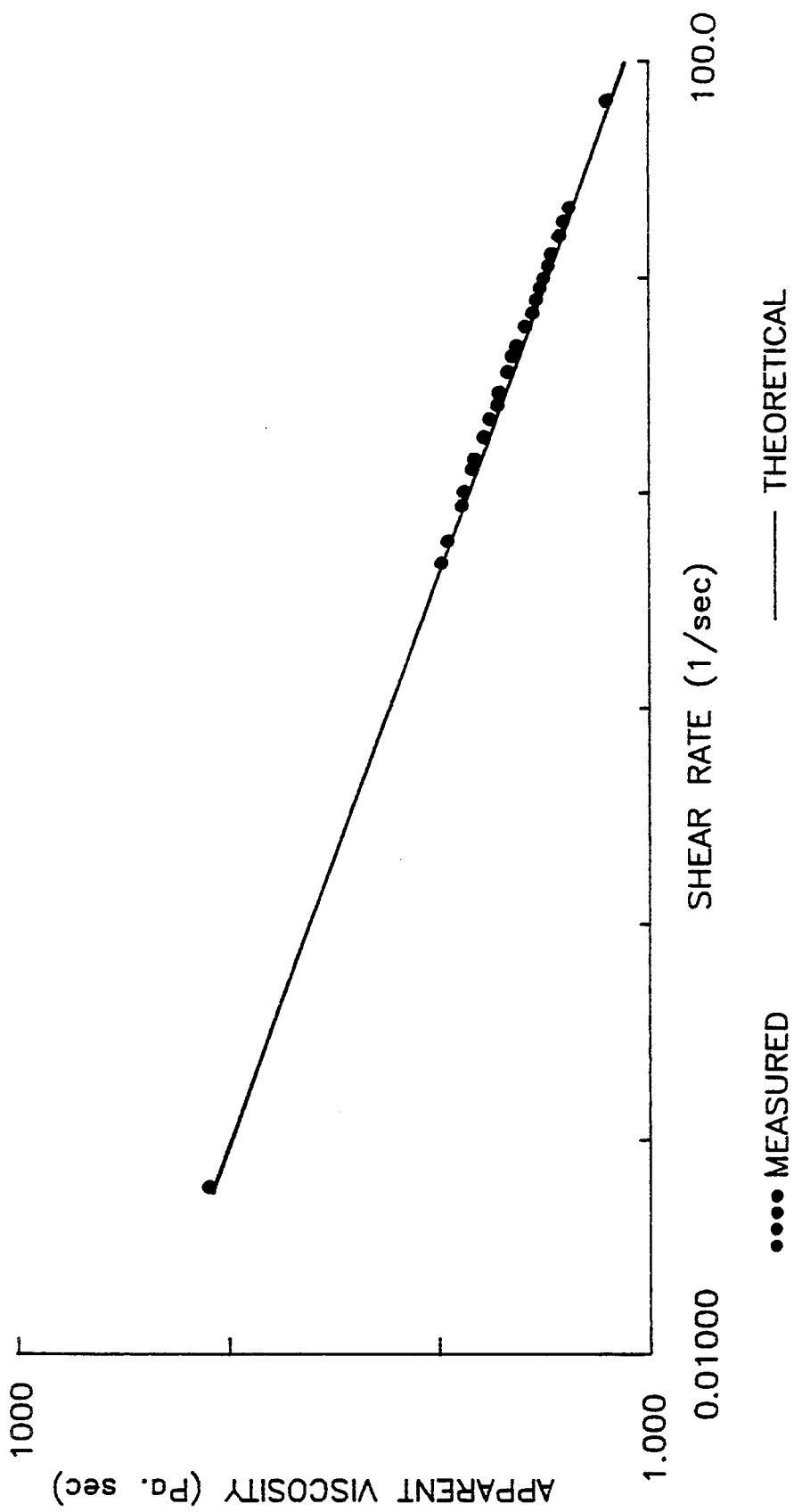
Figure 11:
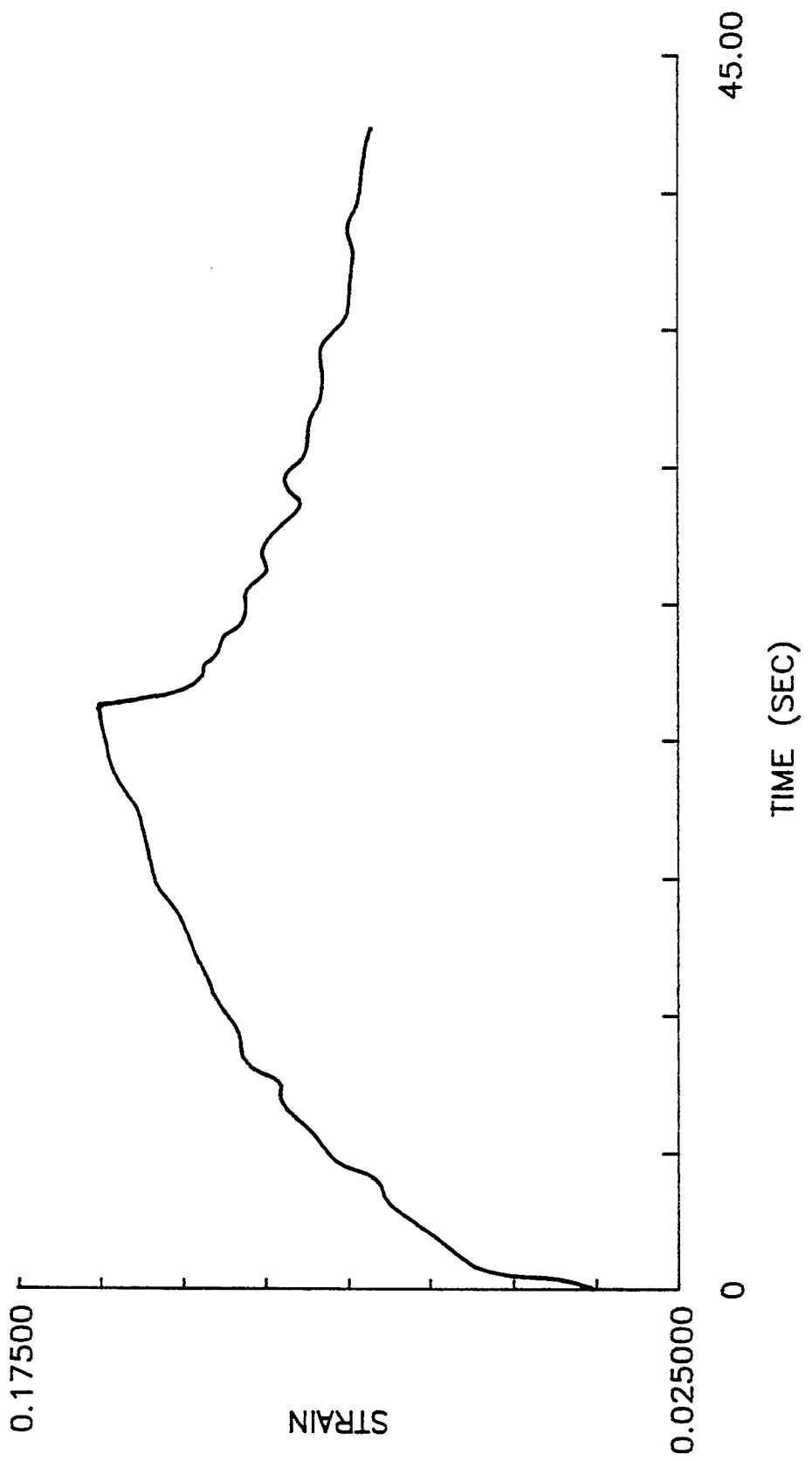
FIGS. 11 to 14 illustrate creep results [plots of strain against time (sec)] for the liquid crystalline compositions of examples A-B-C-E.
Figure 12:
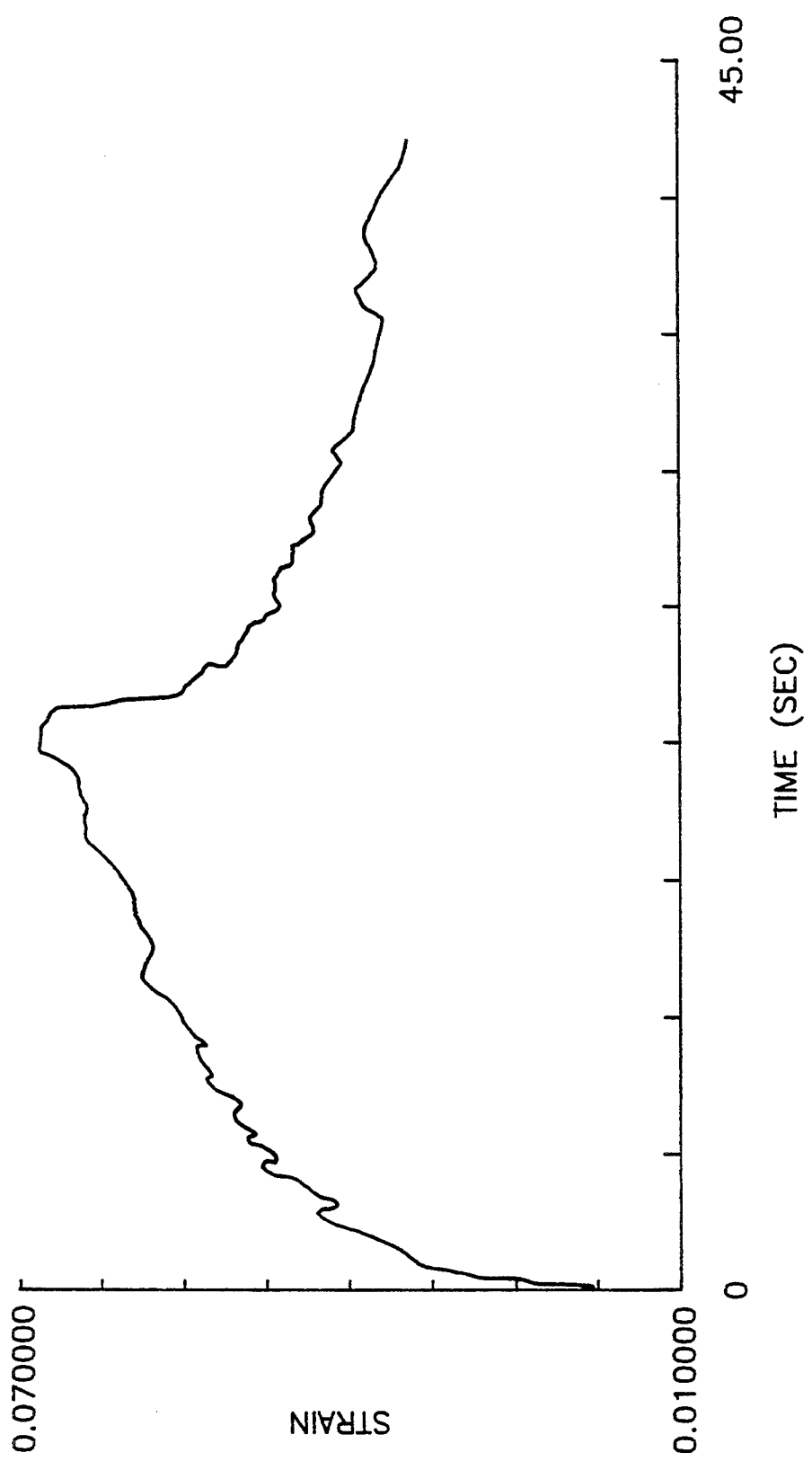
Figure 13:
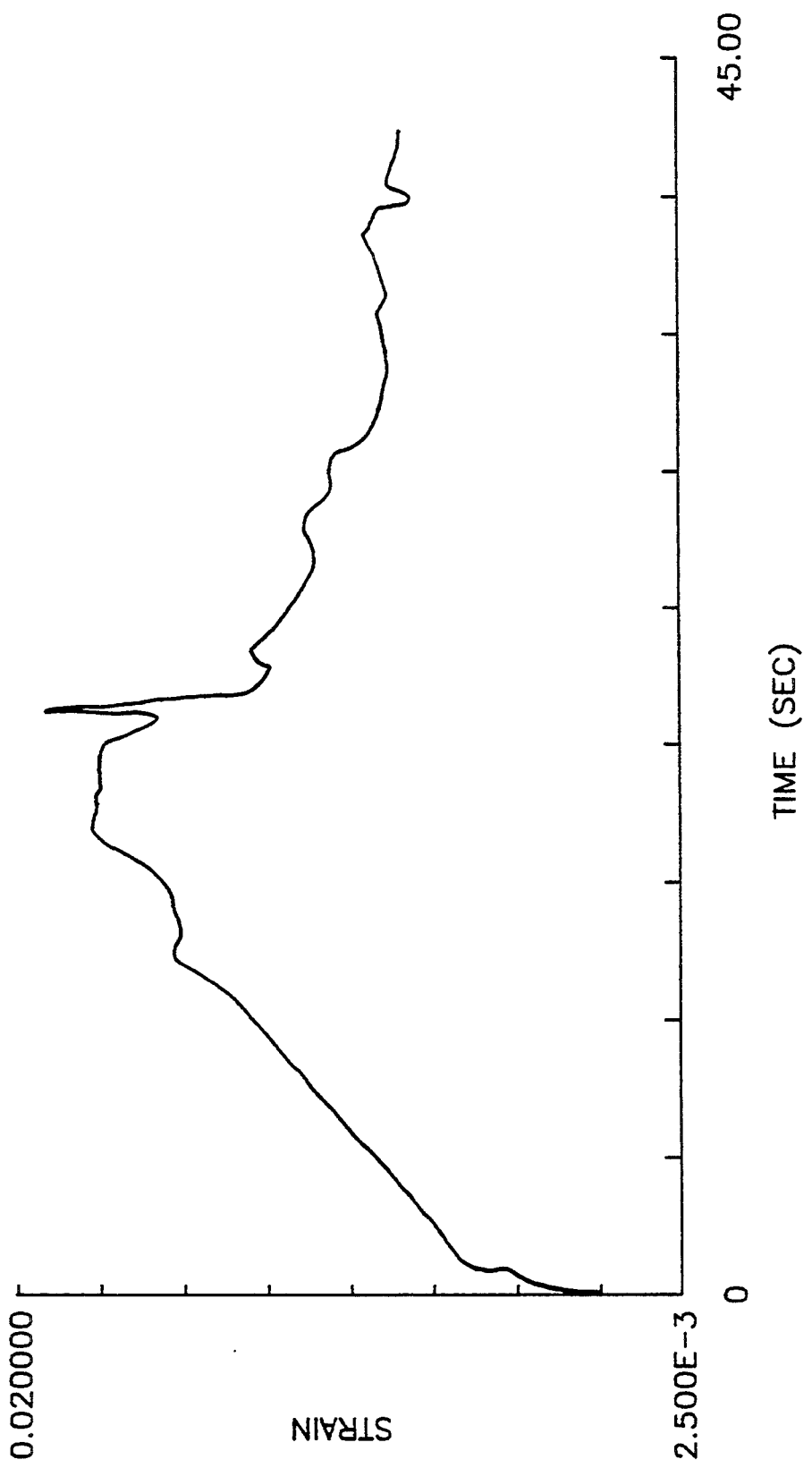
Figure 14:
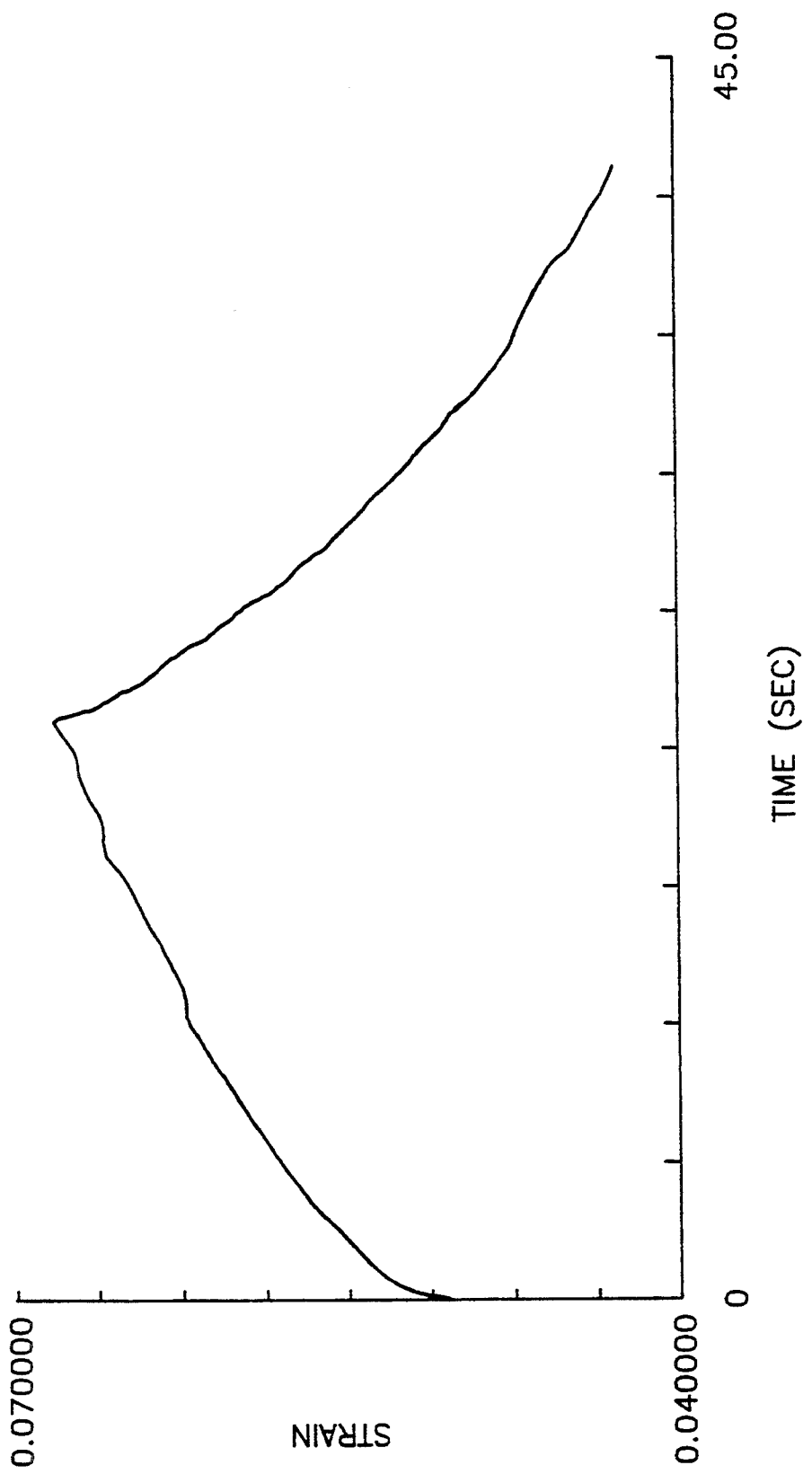

The present invention relates to liquid crystalline composition having an apparent viscosity at a shear rate of $10^{-2}$ $sec^{-1}$ of about 7.5 to about 300 Pa. sec., more preferably about 5 to about 20 Pa. sec. and at 100 $sec^{-1}$ of about 0.05 to about 7.5 Pa. sec., more preferably about 0.05 to 0.5 Pa. sec. which comprises approximately by weight:

(a) 7 to 50% of a nonionic surface active agent, more preferably 8 to 45%, and most preferably 10 to 45%.

(b) 5 to 30%, more preferably 5 to 25%, and most preferably 10 to 25% of an aliphatic hydrocarbon which has about 6 to 16 carbon atoms and more preferably 10 to 14 carbon atoms and a solubility dispersion:parameter ($d_d$) at 25° C. of at least 15.6;

(c) 10 to 90%, more preferably 15 to 60%, and most preferably 15 to 55% of a nonaqueous polar solvent having a Hansen hydrogen bonding solubility parameter ($d_h$) at 25° C. of at least 12.0 and more preferably at least 15.0; and (d) 0 to 50% more preferably 0.5 to 25% and most preferably 1 to 5% of an essentially nonaqueous polar cosolvent having a Hansen hydrogen bonding solubility parameter at 25° C. of at least 20. By the term "essentially" it is meant that the polar solvent will contain less than about 4 wt. % of water, more preferably about 20 wt. % and most preferably about 10 wt. %.

The liquid crystal compositions of the instant invention can be used as a basic formulation for the production of both commercial and industrial applications by the addition of selective ingredients to the liquid crystal composition. Typical compositions which can be formed for a variety of applications are toothpastes, creams or a toothpaste gels, cosmetics, hand creams:, facial creams, eye shadows, lipsticks, metal polish agents fabric cleaners, shampoos, floor cleaners, cleaning paste, title cleaners, bleach compositions, ointments, oven cleaners, stain remover, fabric softener, bleach prespotters, automatic dishwashing compositions, laundry prespotters, pharmaceutical compositions coal slurdes, oil drilling muds, cleaning prestoppers and bathroom cleaners.

The nonionic and ionic surfactants and synthetic organic detergents that are employed in the invented cleaning compositions are preferably water soluble, but such materials that are water dispersible can also be used. The soluble nonionic compounds are usually condensation products of an organic aliphatic or alkyl aromatic hydrophobic compound and a lower alkylene oxide, such as ethylene oxide or other combination of ethylene oxide and propylene oxide, which is hydrophilic. Almost any hydrophobic compound having a carboxy, hydroxy, arnido or amino group with a free hydrogen present can be condensed with ethylene oxide or ethylene oxide in combination with propylene oxide or with polyethylene glycol to form a nonionic detergent. The length of the polyethenoxy chain of the condensation product can be adjusted to achieve the desired balance between the hydrophilic and hydrophilic elements (hydrophilic-lipophilic balance, or HLB).

Particularly suitable nonionic detergents are the condensation products of a higher aliphatic alcohol, such as fatty alcohol, containing about 7 to 20, more preferably about 14 to about 20 carbon atoms, in a straight (or branched) chain configuration, condensed with about to 4 to 13, preferably 5 to 12, and more preferably 5 to 11 and most 5 to 10 moles of ethylene oxide to one mole of the aliphatic alcohol. Particularly preferred such compounds are $C_{14-20}$ alkanol ethoxylates and 5-9 moles of ethylene oxide, which also may be designated as $C_{9-18}$ alcohol EOX:1. wherein X=5 to 9 particularly preferred nonionic suractants are ALFOL 1618-9EO, Dobanol 45-8, Dobanol 23-7 and Dobanol 91-5.

Other possible suitable nonionic detergents are the polyethylene oxide condensates of one mole of alkyl phenol containing from about 8 to 20 carbon atoms in a straight- or branched-chain configuration, with about 5 to 13, preferably 6 to 11 moles of ethylene oxide, such as decyl phenol condensed with 8 moles of ethylene oxide. These aromatic compounds are not as desirable as the aliphatic-alcohol ethoxylates in the invented compositions because they are not as biodegradable.

Another well known group of usable nonionic detergents is marketed under the trade name "Pluronics". These compounds are block copolymers formed by condensation of ethylene oxide with a hydrophobic base formed by the condensation of propylene oxide with propylene glycol. The molecular weight of the hydrophobic portion of the molecule is of the order of 95 to 4,000, preferably 1,200 to 2,500. The condensation of ethylene oxide with the hydrophobic moety increases the water solubility of the hydrophobe. The molecular weight of these polymers is in the range of 1,000 to 15,000, and the polyethylene oxide content may comprise 20 to 80% thereof.

Still other satisfactory nonionic detergents are condensation products of $C_{8\text{-}13}$ alkanol with a heteric mixture of ethylene oxide and propylene oxide. The mole ratio of ethylene oxide to propylene oxide is from at least 1:1 to 4:1, preferably from 1.5:1 to 3.0:1 with the total weight of the ethylene oxide and propylene oxide contents (including the terminal ethanol group or propanol group) being from 60% to 85T, preferable 70% to 80%, of the molecular weight of the nonionic detergent. The higher alkanol may contain 8 to 20 carbon atoms and one such nonionic detergent is the condensation product of $C_{13\text{-}15}$ alkanol with 4 moles of propylene oxide and 7 moles of ethylene oxide, which is available from BASE Corp. under the trade name Plurafax LF400.

Also suitable for incorporation in the invented cleaning compositions are the nonionic detergents that are derived from the condensation of ethylene oxide with the product resulting from the reaction of propylene oxide and ethylene diamine for example, satisfactory such compounds contain from about 40 to 80% of polyethylene by weight, have a molecular weight of from about 5,000 to 11,000, and result from the reaction of ethylene oxide with a hydrophobic base which is a reaction product of ethylene diamine and excess propyoxyethylene oxide, which base is of a molecular weight in the range of 2,500 to 3,000.

Other nonionic surfactants envisioned within the scope of the instant invention are block copolymers of polystyrene/ethylene oxide, stearate or isostearate surfactants containing glycerol or sorbitan moieties, long chain sulfosuccinates, nonionic surfactants based on Guerbet alcohols and polymeric surfactants with polycarboxylic backbones.

A preferred nonionic surfactant of the instant invention is characterized by the formula $$CH_3-(CH_2)_n-O-(CH_2CH_2O)_m-H$$

wherein n is 8 to 17 and m is 5 to 10, wherein m is equal to 5 to 9 is preferred.

Other preferred nonionic surfactants are characterized by the formulas

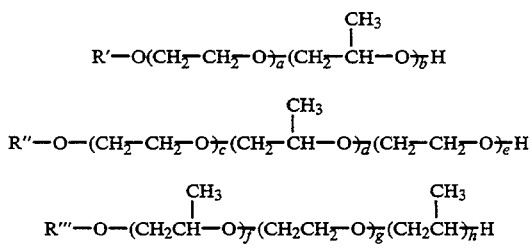

wherein R' is an aliphatic hydrocarbon chain having about 8 to about 18 carbon atoms, R" is an aliphatic hydrocarbon chain having about 8 to about 18 carbon atoms, R''' is an aliphatic hydrocarbon chain having about 8 to about 18 carbon atoms, a is about 20 to about 100%, b is 100-a, c plus e is about 20 to about 100 mole percent, d is 100-(c+e), f plus h is 0 to about 80 percent and g equal 100 -(f+h).

The organic hydrocarbon solvent component of the present liquid crystal compositions includes solvents for the soils and is lipophilic and is a suitable oil, such as a non-polar oil, which is preferably an aliphatic hydrocarbon of 9 to 15 carbon atoms and has the formula $CnH_{2n+2}$ wherein n is 6 to 16 more preferably 10 to 14. Such an aliphatic hydrocarbon is desirably a normal paraffin or an isoparaffin, and of these those which are saturated and of 8 to 16 carbon atoms are preferred, with isoparaffins of 10 to 14 carbon atoms being also preferred.

The most preferred aliphatic hydrocarbon solvent is dodecane. The aliphatic hydrocarbon solvent has a Hansen dispersion solubility parameter at 25° C. of at least about preferably at least about 15.8. The preferred aliphatic hydrocarbon solvents used in forming the liquid crystals compositions have a solubility dispersion parameter at room temperature of at least about 15.6.

The essentially nonaqueous polar solvents used in the formation of the liquid crystal compositions have a Hansen polar solubility parameter at 25° C. of at least 5 and more preferably at least about 10. The polar nonaqueous solvent also has a Hansen hydrogen bonding solubility parameter at 25° C. of at least 12 and more preferably at least 15. Typical polar solvents are diethylene glycol, triethylene glycol, ethylene glycol, ethylene cyanohydrin, perchlorethylene and ethanol amine and mixtures thereof, wherein ethylene glycol is a preferred polar solvent.

An essentially nonaqueous polar cosolvent having a Hansen polar solubility parameter of 25° C. of at least about 10 and a Hansen hydrogen bonding solubility parameter at 25° C. of at least 20 can be used to expand the liquid crystal composition range on the polar solvent/nonionic surfactant/hydrocarbon phase diagram by the modification of the liphobocity of the essentially nonaqueous polar solvent by the more polar cosolvent. A preferred nonaqueous polar cosolvent is glycerol.

In addition to the recited components of the liquid crystal compositions of the present invention there may also be present adjuvant materials for dishwashing, laundering and other detergency applications, which materials may include: foam enhancing agents, such as lauric myristic diethanolamide; foam surpressing agents (when desired), such as silicones, higher fatty acids, and higher fatty acid soaps; preservatives and antioxidants, such as formalin and 2,6-ditert-butyl-p-cresol; pH adjusting agents, such as sulfuric acid and sodium hydroxide; perfumes, colorants (dyes and pigments); and opacifying or pearlescing agents, if desired. In a lithium salt such as a lithium carbonate lithium sulfate or lithium halide such as lithium chloride can be present in the liquid crystal composition at a concentration of 0 to about 10 weight. %, more preferably 0.1 to 5%. The lithium salt has a kosmotropic effect on the nonaqueous polar solvent by functioning to order the structure of the nonaqueous polar solvent.

The liquid crystal compositions can be used in forming cleaning compositions containing enzymes and/or bleachants such as fabric detergent composition or automatic dishwashing compositions which can contain bleachants, at least one enzyme, a suitable phosphate or non phosphate builder system as described in U.S. Pat. No. 07/353,712 which is hereby incorporated by reference. The automatic dishwashing composition formed form the liquid crystal composition can contain alkali metals silicates, bleachants as well as any of the generic types of enzymes such as protease, amylase and lipase enzymes.

A typical detergent composition comprises:

| | |
|---|---|
| Alfol 1618-9EO | 36.8% |
| Dodecane | 9.2% |
| Ethylene glycol | 43.7% |
| Protease slurry Maxacal | 6.0% |
| Amylase Maxamyl | 2.0% |
| Glycerol | 2.3% |

Figure 15:
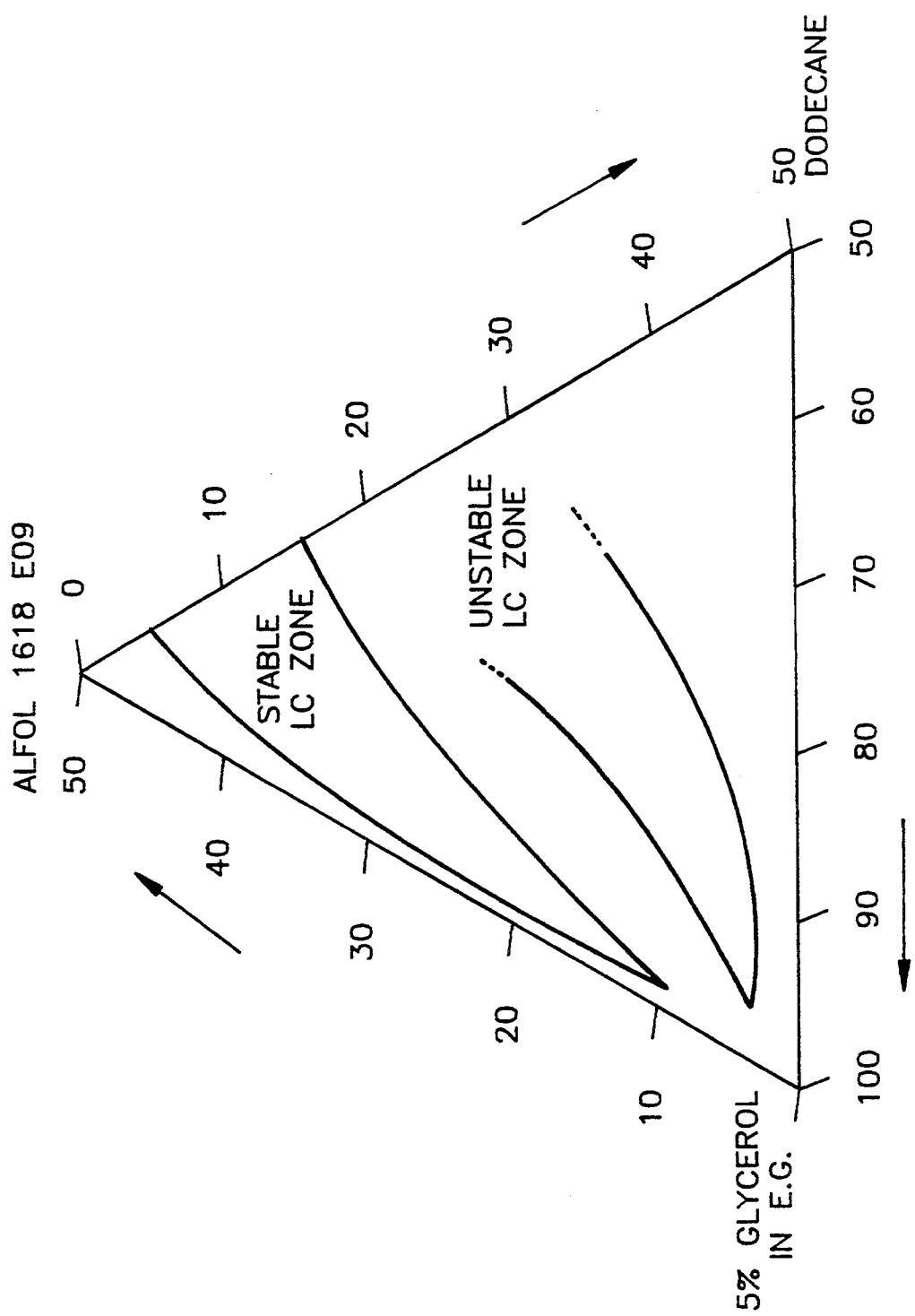
FIG. 15 illustrates the phase diagram of the composition Ethylene Glycol-5% Glycerol/Alfol® 1618 9EO/Dodecane; it includes the liquid crystalline composition of examples A-B-C-E-G.
Figure 16:
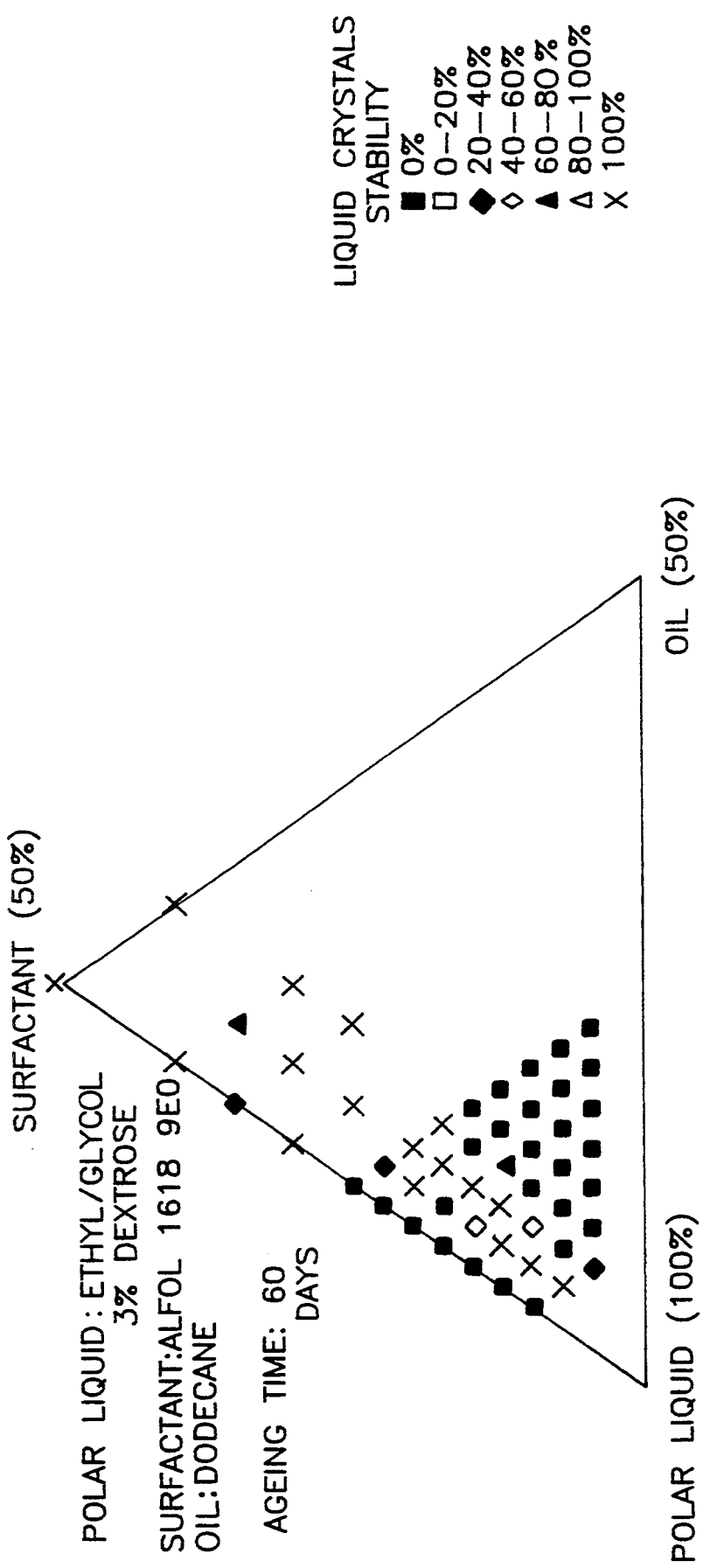
FIG. 16 illustrates the phase diagram of the composition Ethylene Glycol-3% Dextrose/Alfol® 1618 9EO/Dodecane after 60 days aging; it includes the liquid crystalline composition of example D.
Figure 17:
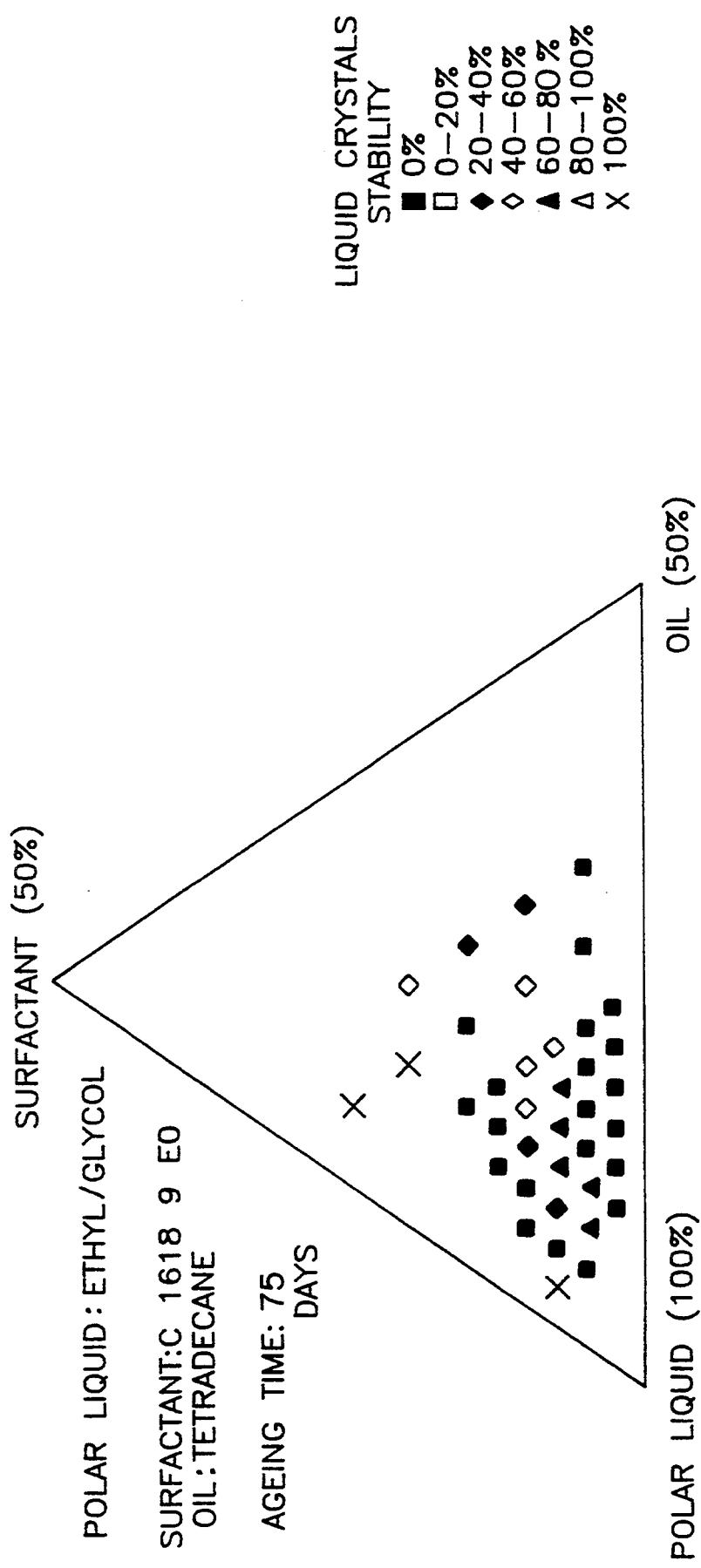
FIG. 17 illustrates the phase diagram of the composition Ethylene Glycol/Alfol® 1618 9EO/Tetradecane after 75 days aging; it includes the liquid crystalline compositions of example F.
Figure 18:
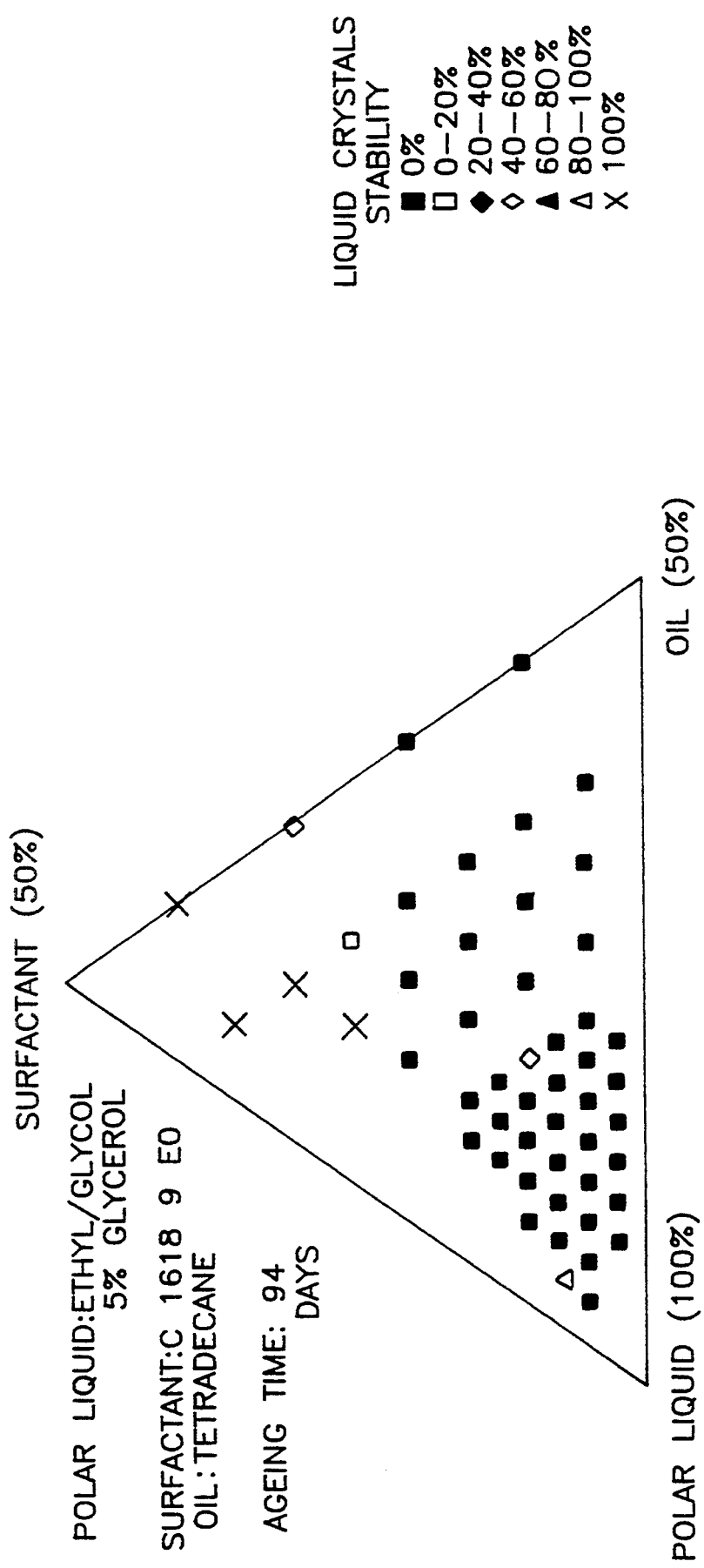
FIG. 18 illustrates the phase diagram of the composition Ethylene Glycol-5% Glycerol/Alfol® 1618 9EO/Tetradecane after 94 days aging.
Figure 19:
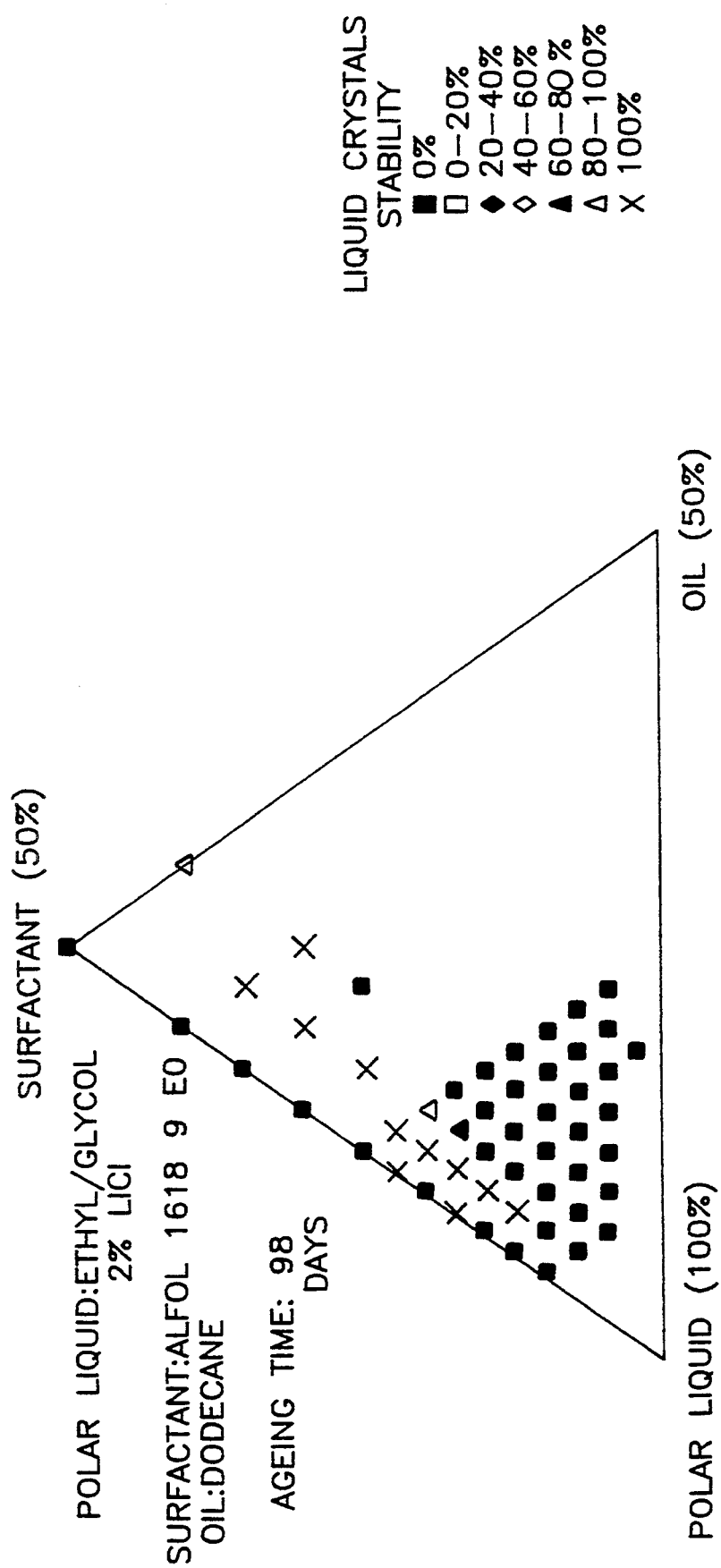
FIG. 19 illustrates the phase diagram of the composition Ethylene Glycol-2% Lithium Chloride/Alfol® 1618 9EO/Dodecane after 98 days aging.
Figure 20:
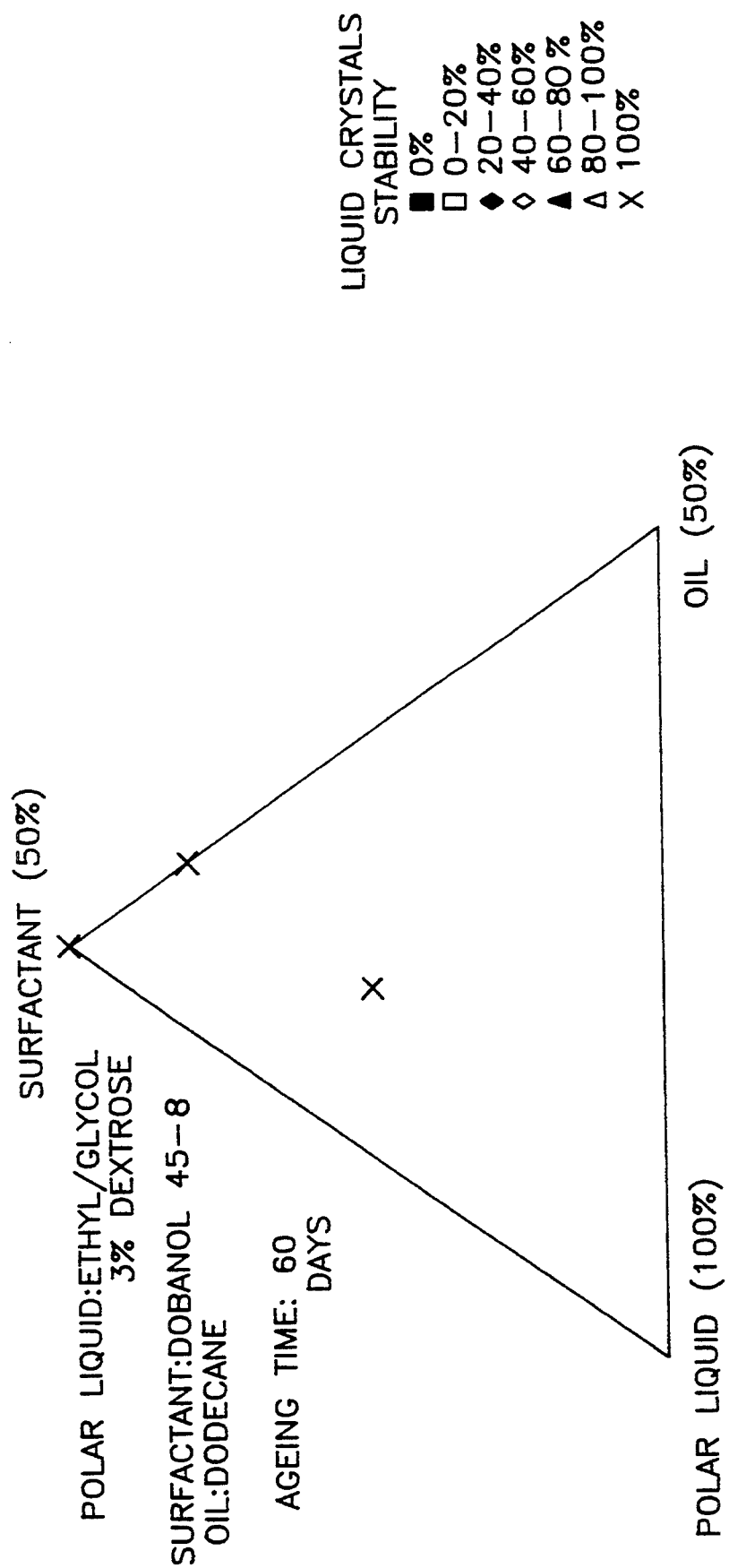
FIG. 20 illustrates the phase diagram of the composition Ethylene Glycol-3% Dextrose/Dobanol® 45 8EO/Dodecane after 60 days aging.

The variations in formulas of liquid crystal compositions within the invention are easily ascertainable and the invention is readily understood when reference is made to this specifications, including the working examples thereof, taken in conjunction with the phase diagrams (FIGS. 15–20). FIG. 15 is a phase diagram of Alfol 1618-9EO, dodecane and a mixture of 95% ethylene glycol-5% glycerol, wherein area 13 designates the stable liquid crystal composition and area 15 designates unstable liquid crystal composition. For illustration the Composition at point 23 marked by X on FIG. 15 comprises 20 weight percent of Alfol 1618-9EO, 60 weight percent of a mixture of 95% ethylene glycol-5% glycerol and 20 weight percent of the decane.

In the previous description of the components of the invented compositions and proportions thereof which may be operative, boundaries were drawn for preferred compositions within the invention but it will be evident that one seeking to manufacture the invented liquid crystal compositions and will select proportions of components indicated by the phase diagrams for the particular compositions, so that the desired compositions will be within the stable liquid crystalline area.

For plotting of the phase diagrams and in experiments undertaken by the inventors to establish the formulas of the desired liquid crystalline compositions many different compositions within the invention were made and were characterized.

To make the liquid crystalline compositions of the invention is relatively simple because they tend to form spontaneously with little need for the addition of energy to promote transformation to the liquid crystalline state. However, to promote uniformity of the composition mixing will normally be undertaken and it has been found desirable first to, but not compulsory, mix the surfactants and polar solvent together followed by admixing of the hydrocarbon solvent component. It is usually necessary to employ heat to melt the nonionic surfactant when it is not under a liquid form at room temperature and most mixings are preferably carried out at about 20°–25° C. or higher.

Pre-spotting and manual cleaning uses of the invented liquid crystal detergent compositions are uncomplicated, requiring no specific or atypical operations. Thus, such compositions may be employed in the same manner as other liquid pre-spotting and detergent compositions. It is not necessary to heat the liquid crystal compositions nor the substrate before application of the liquid crystal detergent (or pre-spotting agent) to the surface to be cleaned. The liquid crystal compositions may be applied to such surfaces by pouring onto them, by application with a cloth or sponge, or by various other contacting means but it is preferred to apply them depending on their viscosity in the form of a spray by spraying them onto the substrate from a hand or finger pressure operated sprayer or squeeze bottle. Such application may be applied onto hard surfaces, such as dishes, walls or floors,, from which lipophilic (usually greasy or oily) soil is to be removed, or may be onto fabrics, such as laundry, which has previously been stained with lipophilic soils, such as motor oil. The invented compositions may be used as detergents and as such may be employed in the same manner in which liquid detergents are normally utilized in dishwashing, floor and wall cleaning and laundering, but it is preferred that they be employed in the same manner in which liquid detergents are normally utilized in dishwashing, floor and wall cleaning and laundering, but it is preferred that they be employed as pre-spotting agents too, in which applications they are found to be extremely useful in loosening the adhesions of lipophilic soils to substrates, thereby promoting much easier compositions or by applications of different commercial detergent compositions or by applications of different commercial detergent compositions, in liquid, bar or particulate forms. When sprayed onto a surface, such as a vertical wall, the present cleaning compositions, adhere to it and do not run or drip excessively, thereby allowing the detergent to work on the lipophilic soil more effectively. The liquid crystal can be converted into a gel by the addition of water. When the transformation to gel form has taken place a sign of it will be thickening of the product and less sagging of product at the original locus of application. The addition of further water to the gel converts the gel into a microemulsion or emulsion and upon the addition of a significant amount of water a clear or turbid solution is achieved thereby facilitating the removal of the composition from the substrate by sponging, rinsing, etc. While the advantages of a thicker and more adhering liquid crystal and/or gel detergent composition are more significant for wall cleaning than for dishwashing, floor cleaning or laundering, even in the cases of such horizontal surfaces or surfaces which can be maintained horizontal, the applied liquid crystal composition or gel form after contact with a minimum amount of water substantially remains at the locus of the application and thereby is better able to perform its cleaning function.

Detergent gels derived from this invented liquid crystal composition can also be used as liquid detergents for the dishwashing of various vessels like glasses, plates or dishes and other table or kitchen utensils—in automatic dishwashers.

They can also be used as liquid detergents for the washing of linen in automatic laundering machines.

In the above applications, the gel can be either placed in the appropriate dispenser or directly poured in the machine or applied on the pieces to be washed.

Such liquid detergents can incorporate water sensitive adjustments like enzymes or bleach.

EXAMPLE I

The following example illustrates but does not limit the scope of the invention. Unless otherwise indicated, all parts in these examples, in the specification and in the appended claims are by weight percent and all temperatures are in °C.

The formulas A–G were prepared according to the following procedure:
(1) When present in the composition, the additive (e.g. dextrose) or the cosolvent (e.g. glycerol) was first premixed with the polar solvent (e.g. ethylene glycol) in the appropriate proportions and under stirring.
(2) The surfactant (e.g. Alfol® 1618 9EO) was melted with heat and then added with mixing, in the appropriate proportion, to the polar solvent or to the above polar solvent-additive mixture.

(3) The oil is eventually added with mixing to the above premix.

Since the order of addition is not compulsory to obtain the expected liquid crystalline structure, other sequences can be successfully used.

The rheology measurements were made, unless otherwise indicated at 25° C. and on a stress controlled Carrimed rheometer.

|  | A | B | C | D | E | F | G |
|---|---|---|---|---|---|---|---|
| Alfol ® 1618 9EO | 10.0% | 12.5% | 15.0% | 15.0% | 22.5% | 25.0% | 40.0% |
| Dodecane | 2.5% | 2.5% | 2.5% | 2.5% | 2.5% | — | 10.0% |
| Tetradecane | — | — | — | — | — | 5.0% | — |
| Ethylene glycol | 83.125% | 80.750% | 78.375% | 80.025% | 71.250% | 70.000% | 47.500% |
| Glycerol | 4.375% | 4.250% | 4.125% | — | 3.750% | — | 2.500% |
| Dextrose | — | — | — | 2.475% | — | — | — |
| G' (Pa) | 15 (1Hz-25° C.) | — | 209 (10Hz-20° C.) | 283 (10Hz-20° C.) | 23.5 (1Hz-25° C.) | 65 (1Hz-25° C.) | 5165 (10Hz20° C.) |
| G' (PA) | 16 (1Hz-25° C.) | — | 159 (10Hz-20° C.) | 305.2 (10Hz-20° C.) | 57 (1Hz-25° C.) | 67 (1Hz-25° C.) | 1409 (10Hz20° C.) |
| Apparent viscosity (Pa. sec) 25° C., 0.01 sec$^{-1}$ | 1.489 | 2.29 | 16.301 | — | 7.348 | — | 298.384 (20° C.) |
| Apparent viscosity (Pa. sec) 25° C., 100 sec$^{-1}$ | 0.059 | 0.072 | 0.112 | — | 0.204 | — | 1.12 (20° C.) |

The major benefits to use nonaqueous liquid crystal compositions are found in the following applications: liquid detergents incorporating water sensitive ingredients which remain stable under long periods of time; or liquid detergents with solid or insoluble particles which do not settle over long periods of time; or concentrated detergents which are pourable (aqueous concentrated detergents form gels and are not pourable) and which are easily dispensable or soluble in water and which can possibly form microemulsions after dilution in water; or waterless liquid crystal which adhere to vertical surfaces and are effective in neat or in diluted forms; or any combination of the above.

The various advantages of the invention have already been set forth in some detail and will not be repeated here. However, it will be reiterated that the invention relates to the important discovery that effective liquid detergent compositions can be made in the liquid crystal state and that because they are in such state they are especially effective in removing lipophilic soils from substrates and also are effective in removing from substrates non-lipophilic soils which are bound to the substrates by lipophilic materials. Such desirable properties of the liquid crystal detergent compositions of this invention make them ideal for use as pro-spotting agents and detergents for removing hard-to-remove soils from substrates in various hard and soft surface cleaning operations. Especially important is the spontaneous conversion of the invented compositions to the gel form during which conversion lipophilic soil is loosened and absorbed with the gel without the need for applications of significant amounts of energy, either in thermal or mechanical form. Thus, the invention is a significant one and represents an important technical advance in the art.

The invention has been described with respect to various embodiments and illustrations and these embodiments and illustrations are not to be considered as being limited to these because it is evident that one of skill in the art with the present specification before him or her will be able to utilize substitutes and equivalents without departing from scope of the invention.

What is claimed is:

1. A nonaqeuous liquid crystal composition having an apparent viscosity at $10^{-2}$ sec$^{-1}$ of about 1.5 to about 300 Pa and an apparent viscosity at $10^2$ sec$^{-1}$ of about 0.05 to about 1.5 Pa which comprises approximately by weight:
   (a) 7 to 70% of a nonionic surface active agent;
   (b) 5 to 30% of an aliphatic hydrocarbon having about 6 to about 16 carbon atoms; and
   (c) 10 to 90% of an essentially nonaqueous polar solvent having a hydrogen bonding cohesion parameter at 25° C. of at least about 12M Pa$^{\frac{1}{2}}$; and
   (d) 0 to 50% of an essentially nonaqueous polar cosolvent having a Hansen hydrogen bonding cohesion parameter at 25° C. of at least about 20M PA$^{\frac{1}{2}}$.

2. A composition according to claim 1 wherein said nonionic surface active agent is condensation product of a mole of higher fatty alcohol having about 14 to 22 carbon atoms with 8 to 13 moles of ethylene oxide or ethylene oxide and propylene oxide and is present in the composition at a concentration of about 8 to about 45 percent.

3. A composition according to claim 2 wherein such aliphatic hydrocarbon has 8 to 14 carbon atoms and is present at a concentration of about 5 to about 15%.

4. A composition according to claim 3, wherein said essentially nonaqueous polar solvent is present in the composition at a concentration of about 50 to 80% and said composition is a liquid crystal.

5. A composition according to claim 4, wherein said polar cosolvent is present at a concentration of about 1 to about 25%.

6. A composition according to claim 4, wherein said liquid crystal is sprayable by a hand operated pump sprayer.

7. A composition according to claim 4, wherein said composition is transformed into a gel, when contacted with water.

8. A composition accordingly to claim 4, wherein said composition is transformed into a turbid solution, an emulsion or a microemulsion when contacted with water.

9. A composition according to claim 4, further including about 0.1 to about 25 weight percent of at least one water sensitive material suspended in said composition.

10. A composition according to claim 9, wherein said water sensitive material is an enzyme and/or bleachant.

11. A composition according to claim 9, containing at least one solid particle and/or liquid droplet in said composition.

12. A composition accordingly to claim 1, wherein said nonionic surface active agent is a condensation product of one mole of a fatty alcohol having 8 to 18 carbon atoms and 5 to 9 moles of ethylene oxide, said aliphatic hydrocarbon is dodecane, said polar solvent is selected from the group consisting essentially of ethylene glycol, ethanol amine, ethylene cyanohydrin and perchloroethylene and mixture thereof and said polar cosolvent is glycerol.

13. A composition according to claim 1, wherein said polar solvent is ethylene glycol.

14. A composition according to claim 4, further including about 0.1 to about 10 weight percent of lithium chloride.

15. A process for treating materials soiled with soils to loosen or remove it which comprises applying to the locus of such soil on such material a soil loosening or removing amount of a composition according to claim 1.

16. A process accordingly to claim 15 wherein the composition is applied as a pre-treatment to material soiled with hard-to-remove soil at the locus thereof on the material, after which application the soil is removed by application water.

17. A process according to claim 16 wherein the composition is applied as a pre-treatment onto dishes having deposits thereon before hand washing of such dishes in wash water containing a dishwashing detergent composition.

18. A process according to claim 16 wherein the composition is applied as a pre-spotting treatment onto laundry soiled with oily or greasy soils at the loci of such soils before washing of the laundry in the water containing a laundry detergent composition.

19. A process for absorbing a soil from a surface into a liquid crystal composition and converting such liquid crystal composition to a thinner microemulsion or emulsion upon contact with water which comprises transforming a liquid crystal composition to a thinner microemulsion or emulsion which comprises applying a liquid composition of claim 1 to the lipophilic soil on the surface, whereby the soil is absorbed into the liquid crystal composition and the composition is converted to a microemulsion or emulsion upon contact with water wherein the microemulsion or emulsion is of a lower viscosity than the viscosity of the liquid crystal composition and is readily removable from the surface upon further contact with additional water to form a turbid solution.

20. A process accordingly to claim 19 wherein the liquid crystal composition is contacted with the lipophilic soil on the surface, on which it remains as a surface adherent liquid until the soil is absorbed by it, and the liquid crystal is contacted with water at which point it is converted to a thinner microemulsion or emulsion form.

* * * * *